United States Patent [19]

Rodriguez-Wong et al.

[11] Patent Number: 5,807,419
[45] Date of Patent: Sep. 15, 1998

[54] APPARATUS FOR THE SHAPING AND TRANSFERRING OF GLASS ARTICLES OR OTHER MATERIALS

[75] Inventors: Gaspar Rodriguez-Wong; Luis Cardenas-Franco; Victor Garcia-Gomez, all of Nuevo Leon, Mexico

[73] Assignee: Vidriera Monterrey, S.A. De C.V., Monterrey, Mexico

[21] Appl. No.: 575,581

[22] Filed: Dec. 20, 1995

Related U.S. Application Data

[63] Continuation of Ser. No. 167,226, Dec. 14, 1993, abandoned.

[51] Int. Cl.⁶ .................................................. C03B 9/00
[52] U.S. Cl. ............................. 65/229; 65/260; 65/261; 65/348; 65/79; 65/82; 65/84
[58] Field of Search ................................ 65/79, 80, 82, 65/84, 85, 260, 229, 261, 264, 348

[56] References Cited

U.S. PATENT DOCUMENTS

| | | | |
|---|---|---|---|
| 3,914,120 | 10/1975 | Foster | 65/241 |
| 4,009,016 | 2/1977 | Foster | 65/361 |
| 4,009,019 | 2/1977 | Foster | 65/261 |
| 4,010,021 | 3/1977 | Foster | 65/241 |
| 4,255,179 | 3/1981 | Foster | 65/79 |
| 4,325,725 | 4/1982 | Fujimoto | 65/260 |
| 4,525,195 | 6/1985 | Foster | 65/260 |
| 4,529,432 | 7/1985 | Nebelung et al. | 65/260 |
| 4,530,711 | 7/1985 | Nebelung et al. | 65/260 |
| 4,636,241 | 1/1997 | Nebelung | 65/260 |
| 5,073,182 | 12/1991 | Virey et al. | 65/84 |
| 5,271,757 | 12/1993 | Houben et al. | 65/260 |

FOREIGN PATENT DOCUMENTS

| | | | |
|---|---|---|---|
| 888150 | 6/1953 | Germany | 65/261 |
| 1491859 | 11/1977 | United Kingdom . | |

*Primary Examiner*—Steven P. Griffin
*Attorney, Agent, or Firm*—Abelman, Frayne & Schwab

[57] ABSTRACT

An apparatus for shaping and transferring of a glass article is provided for a glassware forming machine in order to shape a glass parison in a blowing mold and to transfer the shaped glass article from the blowing mold to a deadplate in front of the machine. A blow nozzle, a blow head, and a take-out mechanism are coupled in a housing to form, cool, and grip the article. The blow nozzle is provided to blow air for the forming of the article and to cool the article once that article has been shaped. The blow head is provided to form a pressure chamber when the blow head is positioned on the blowing mold during the shaping of the glass article, the blow nozzle passing within and through the blow head. The take-out mechanism for gripping the glass article is pivotally mounted in an external part of the housing for movement between a gripping position to grip the glass article after the article has been shaped in the blowing mold and a retracted position to release the article. The blow head is independently retracted from the blow nozzle to permit the take-out mechanism to grip the article.

4 Claims, 4 Drawing Sheets

APPARATUS FOR THE SHAPING AND TRANSFERRING OF GLASS ARTICLES OR OTHER MATERIALS

This application is a continuation application under 37 C.F.R. 1.62 of prior application Ser. No. 08/167,226, filed on Dec. 14, 1993, now abandoned.

BACKGROUND OF THE INVENTION

In the glassware forming process, such as the press-blow or the blow-blow processes, a gob of glass is feed through each one of the sections of the forming machine, for example of the I.S. type, which forms a pre-form, or a parison of the article, in an inverted position and also forming the fill neck ring portion, and later, the parison is inverted to a normal position and placed in a blowing mold where the article is given a final shape.

Once that the article has been formed in the blowing mold, a take-out tong head mechanism transfers the article from the blowing mold to a cooling plate where the article is given an initial cooling period. Later, the article is moved onto a cross conveyor towards a glass annealing lehr, where all of the thermal stress, which the article might have suffered during its manufacturing process, are removed.

Within a time sequence, the conventional system for the formation of glass articles includes: a neck ring forming time period, during which a funnel is coupled over a parison mold in order to load a glass gob within the said mold. Subsequently, a baffle is placed on the funnel (which might already be integrated in the mold, as is shown in the U.S. Pat. No. 4,367,088) in order to supply a blow-down operation which will insure the filling up, and the formation of the crown of the parison. After this, there exists a time period during which the glass gob remains inside the parison mold, while the baffle makes a second movement in order to be coupled directly on the parison mold. In this manner the baffle functions as the bottom of the parison during a blow-back from the neck ring end which results in final shaping of the parison.

Once the parison is formed, an inverting mechanism transfers the parison to a blowing mold, wherein a blowing head is connected to said mold to give the final shape to the article. After the article has been formed, the blowing head is disconnected and a take-out mechanism is connected over the neck of the article that was recently formed, in order to hold and transport said article towards a cooling plate where it is initially cooled. Later, the article is transported on an endless moving conveyor to a glass annealing lehr. As can be observed in the glassware manufacturing process, once the article has been transferred to the blowing mold, a blowing head is connected onto the blowing mold in order to provide the final shape of the glass article. However, as can be seen in said process, while the blowing head is forming the article, the take-out mechanism has to wait a determined period of time (dead time) in order that the blowing head mechanism can be removed from the blowing mold, and the take-out mechanism can initiate its movement toward said blowing mold in order to hold and transfer the recently formed article.

In keeping with the forming cycle of the articles through the previously cited process, it is not possible to reduce the operation time of the machine and/or reduce the formation time of the glass article. This is so because if the speed of the machine were to be increased it would cause certain mechanisms to strike each other, such as, for example, the collision of the tongs of the take-out mechanism against the blowing mold, or against the arm of the blowing head.

In view of the above, and with the objective in mind of reducing the period of time the glass article forming machines operate in, such as, for example of the I.S. type, the present invention refers to a mechanism for the formation and transference of glass articles which integrates in a single mechanism the function of the final blowing for the formation of glass articles, and, with the same mechanism carries out the action of holding and transferring the recently formed article from the blowing mold to the cooling plate.

OBJECTIVES OF THE INVENTION

Therefore, it is an objective of the present invention to provide a method and an apparatus for the forming and transferring of glass articles, which reduces the operation time period of the forming machine using a mechanism for carrying out the function of "forming-cooling-transference" of articles, as a single operation.

Another objective of the present invention is to provide a method and an apparatus for the forming and transferring of glass articles, which reduces the container shaping cycle operation time.

An additional objective of the present invention is to provide a method and an apparatus for forming, and transferring glass articles which eliminates the head blowing mechanism of the glass forming machines of the previous art.

Still another objective of the present invention is to provide a method and an apparatus for forming and transferring glass articles which uses a flow of air under pressure, for forming the article and for cooling the container. The cooling air can be provided with some coating film in order to reinforce the inside of the container.

An additional objective of the present invention is to provide a method and an apparatus for forming and transferring the glass articles which can cool the container, or recently formed article from the time that its forming is ended up to before it is deposited on an article transporting conveyor.

BRIEF DESCRIPTION OF THE DRAWINGS

The novel aspects which are considered to be characteristics of the present invention will be particularly claimed in the attached claims. However, the invention itself, both because of its organization as well as because of its operation method, jointly with other goals and advantages it includes, will be better understood in the following detailed description of an embodiment of the same, when it is read in relation to the attached drawings, wherein:

DETAILED DESCRIPTION OF THE INVENTION

Figure 1:
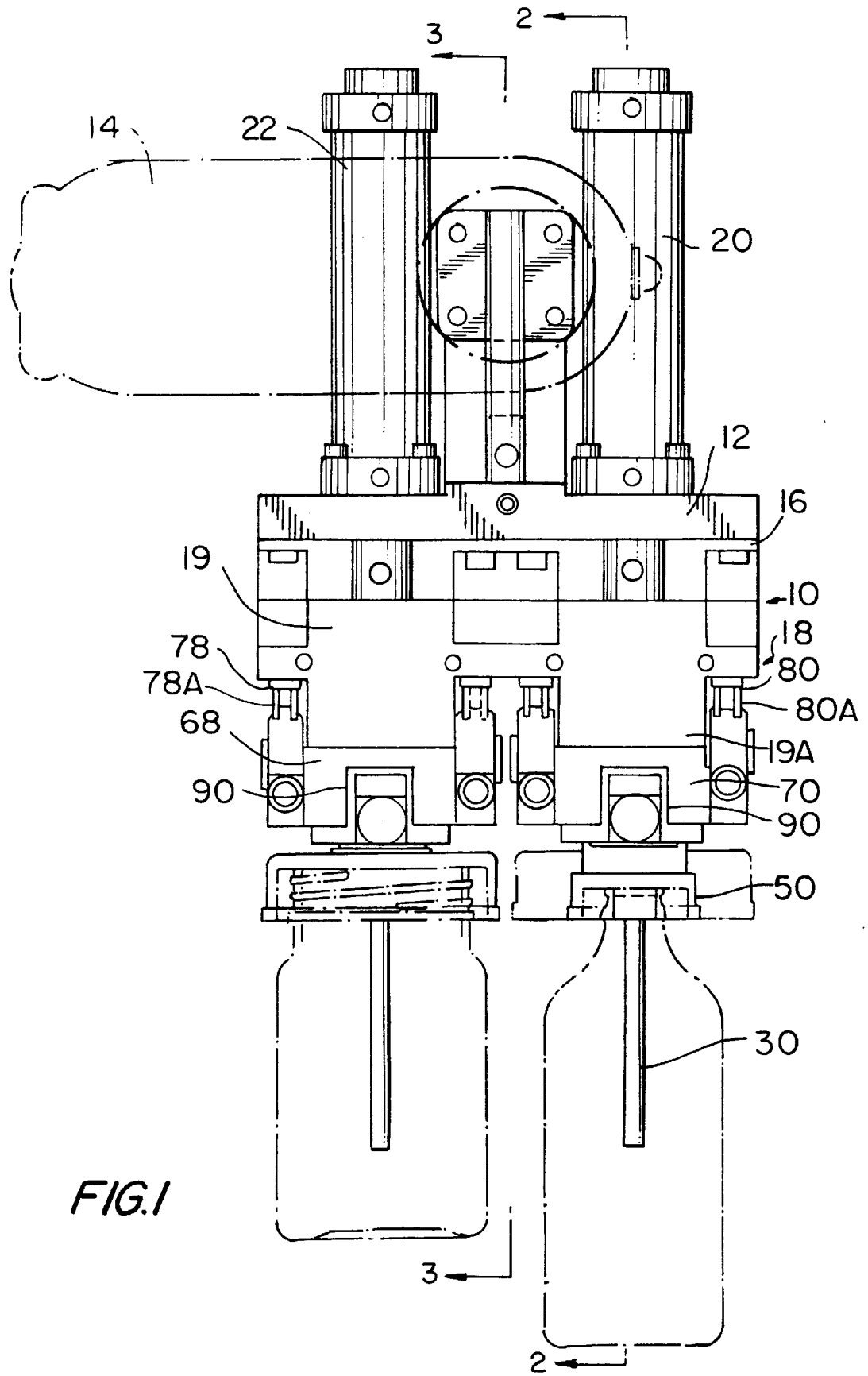
FIG. 1 is an elevation view that shows the front part of the apparatus used to form and transfer the glass articles of the present invention.
Figure 4:
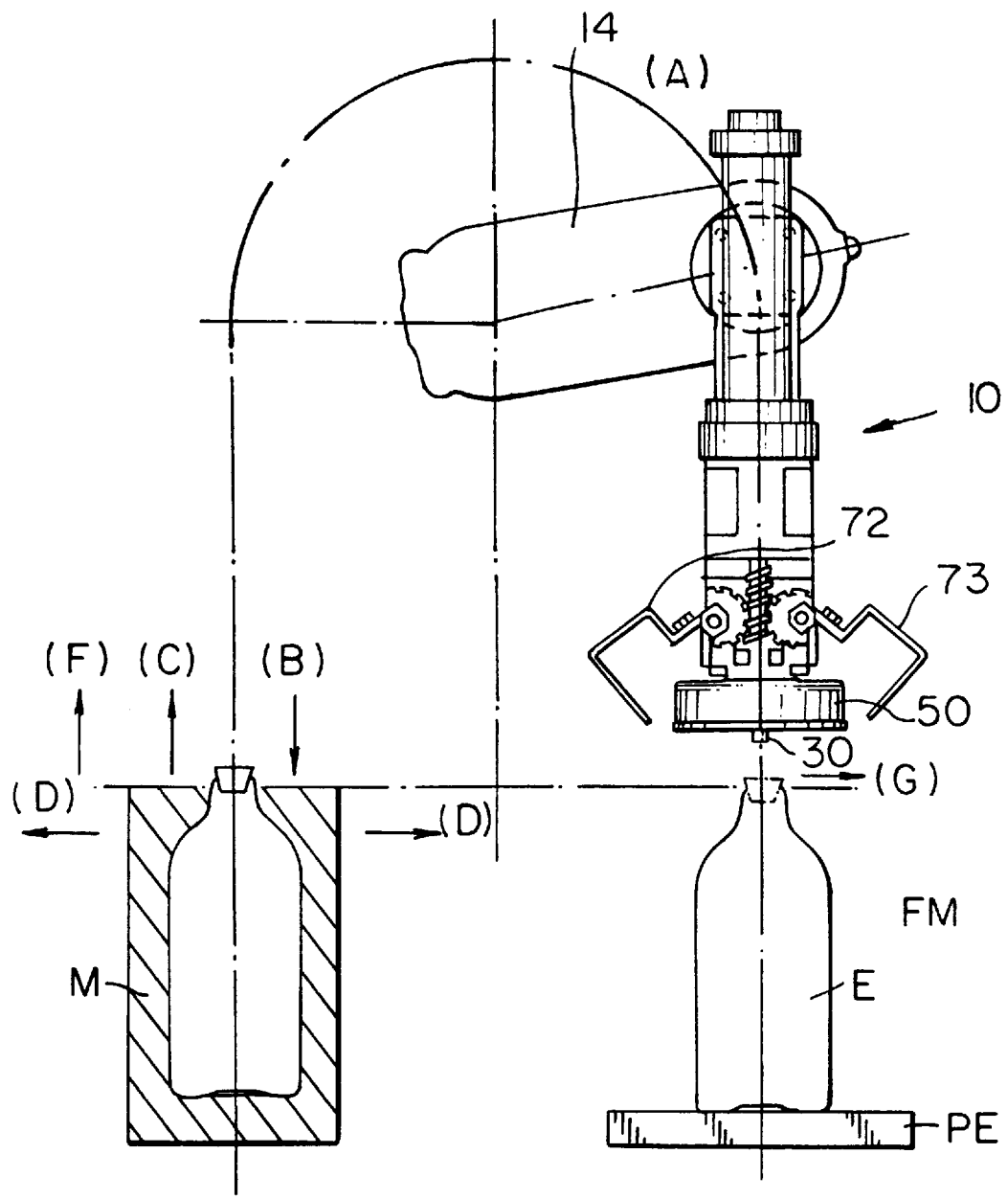

Making reference to FIG. 1, the forming and transference apparatus, 10, of the present invention will be now described. The apparatus 10 integrates, in a single mechanism the function of "forming-cooling-transferring," of glass articles as a single operation. Said apparatus 10 comprising: a support structure, 12, which is connected on a pivot at its upper part to an oscillating arm, 14, in order to carry out the holding and transference movement of a recently formed (not shown) article in the blowing mold, M, towards a dead plate PE in the front of machine. (FIG. 4).

As can be seen in the specific embodiment illustrated in FIG. 1, the forming and transferring mechanism, 10, will be described for the forming-transferring of two articles. However, through this concept, it is possible to design the apparatus, 10, for the forming and transferring of one, two or more glass articles.

Making particular reference to the forming and transferring apparatus, 10, illustrated in FIG. 1, the support structure 12 comprising: a supporting cover, 16, connected to the lower part of the same. A chamber, 18, including a pair of cylinders, 19 and 19A, which form the body of the forming and transference apparatus, 10, of the present invention, and which are located to coincide with the lower part of the supporting cover 16.

Figure 2:
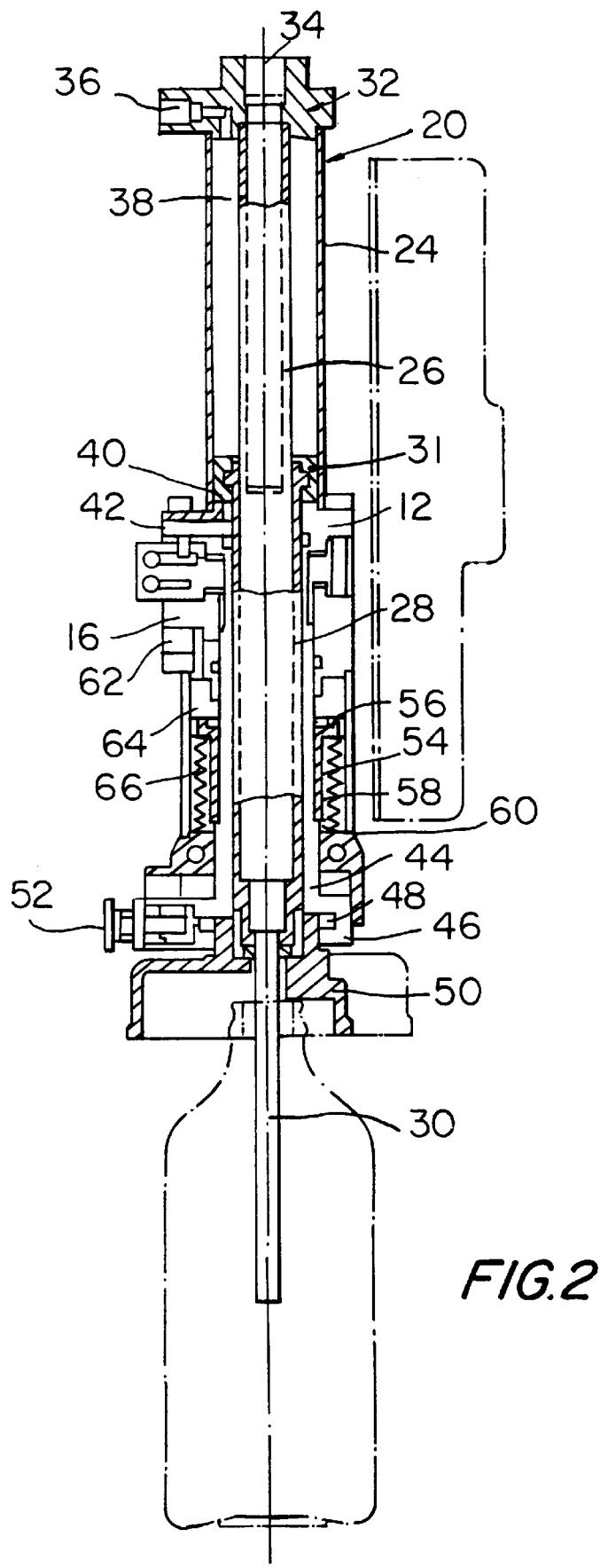
FIG. 2 is an elevation view, in a longitudinal cross section, taken along the B—B line of the glass article forming and transferring apparatus, as shown in FIG. 1.

As can be appreciated in FIG. 1, two cylinder-piston assemblies 20, 22 are shown. In FIG. 2, the cylinder-piston assembly 20, which is shown in detail is coupled vertically by the upper part of support structure 12. However, in order to better understand mechanism 10, only one section of the stated mechanism will be explained in detail, it specifically refers to the part pertaining to the longitudinal cross section, taken along the B—B line, illustrated in FIG. 2.

As was already previously mentioned, the cylinder-piston assembly, 20, is positioned over the upper part of the structure 12, which basically includes: a cylinder 24, a first hollow central fixed shaft, 26, along the entire length of the cylinder, 24; a second central hollow shaft, 28, which includes a piston 31, which slides vertically through its internal part over the exterior surface of the first hollow shaft, 26, and on its outside section over the internal face of cylinder 24. Said second shaft, 28, has connected, to its lower part, an interchangeable blowing nozzle 30, which provides, during the first movement of the forming-transference apparatus, 10, the blown air for shaping the article within the blow mold, M, and in a second movement, the air for cooling the recently formed glass article. The stated second shaft, 28, has an ascending and descending movement through the internal part of cylinder 19, of the apparatus, 10, of the present invention.

A cover, 32, over the upper part of cylinder 24, includes: a first entrance orifice, 34, that coincides with the central hollow shaft, 26, in order to permit the air flow for the blowing and cooling of the glass article. A second entrance orifice, 36, is located in the stated cover, 32, in order to introduce the air flow to a first chamber, 38, formed between said cylinder, 24, and the shaft, 26, and so be able to carry out the descending movement of the second shaft, 28.

The ascending movement of shaft, 28, is carried out by means of an air flow which is introduced to a second chamber, 40, formed between the cylinder, 24, and the shaft, 26, by means of a third entrance orifice, 42, which is located in the lateral section of the support structure, 12.

A third hollow shaft, 44, is placed axially around the second central sliding shaft, 28. Said third hollow shaft, 44, includes, in its lower part, a support section, 46, with a notched section, 48, to which is connected a blow head, 50, for forming the article. The stated blow head, 50, is introduced in the notched section, 48, of the shaft, 44, and it can be interchanged in keeping with the size of the article, as is schematically shown in FIGS. 1 and 2.

The stated blow head, 50, is fixed by means of a holding lock, 52, which is connected to the lower end of the third hollow shaft 44. In agreement with the previous arrangement, the hollow shaft, 44, and the blow head, 50, will have an ascending and descending movement during the formation of the glass article, which will be explained as follows.

As can be seen in FIG. 2, the arrangement of the third hollow shaft, 44, includes a fourth hollow shaft, 54, that is connected fixed, and in an axial manner, around the third hollow shaft, 44. The stated shaft 54, includes a piston, 56, which slides over the inside face of cylinder 19. The piston, 56, includes, besides, a hollow circular section, 58, that projects downward, and which serves as a stop to limit the descending traveling of shaft, 44, at the moment it makes contact with the upper section of the stop, 60, of cylinder 19.

The downward movement of the third shaft, 44, is effected by introducing pressurized air through an entrance orifice, 62 located on the supporting cover 16, introducing pressurized air to a chamber 64, which is formed between cylinder 19, the piston 56, and the outer part of shaft 44.

In respect to the upward movement of the third shaft, 44, the same is carried out by means of a spring, 66, located between the lower face of piston, 56, and the upper section of the stop, 60, of cylinder 19. Said spring, 66 is compressed during the descending movement of shaft, 44, by piston, 56, through the pressure exerted by the air in chamber 64. However, once the air flow stops operating, the spring, 66, returns to its original position, causing the upward movement of said piston, 56, and with this it also moves shaft 44. The ascending movement of shaft, 44, is limited in this case by the supporting cover 16.

Figure 3:
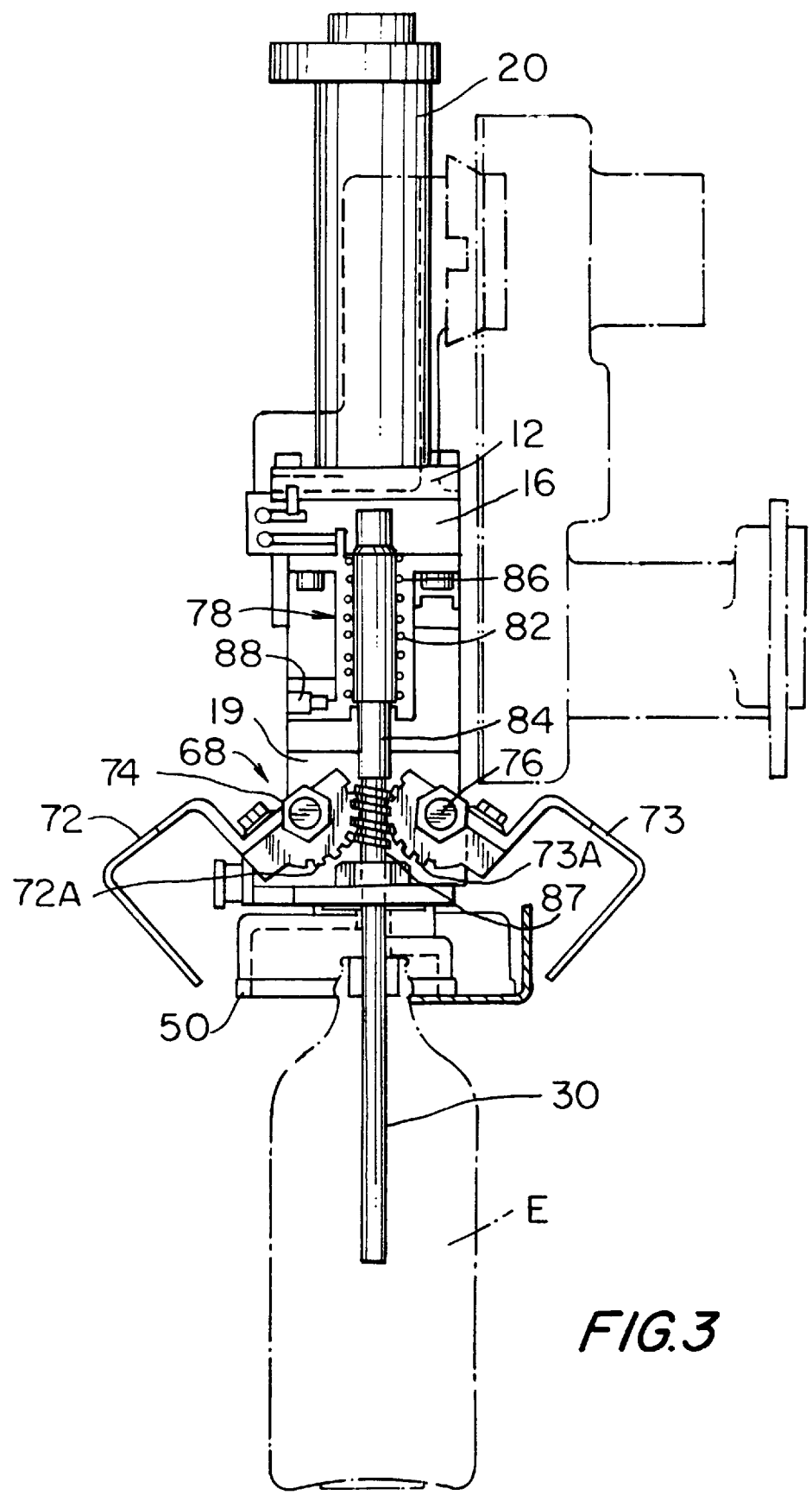
FIG. 3, is another elevation view, in a longitudinal cross section, taken along the A—A line of the apparatus used to form and transfer the glass articles appearing in FIG. 1; and, FIG. 4, shows a schematic diagram of the operation cycle that forms glass articles and which includes the apparatus of the present invention.

Now making particular reference to FIG. 3, which shows, as has already been commented, an elevated view, of a longitudinal cross section taken along the length of line A—A, of mechanism, 10, illustrated by FIG. 1. As can be comparatively seen between FIGS. 1 and 3, the forming and transferring mechanism, 10, includes a pair of tongs, 68, 70, (FIG. 1), which position themselves over the neck of the recently formed article, once the forming step of the article has ended. Said tongs, 68, 70, hold and transport the aforementioned article from the blow mold towards a cooling plate, and this happens before it is deposited over a deadplate PE, and later, towards a cross conveyor belt which will take it to an annealing lehr (not shown).

As can be seen in FIGS. 1 and 3, each tong, 68, 70, is connected on a pivot on the external part of each one of the cylindrical cavities, 19, 19A, of chamber 18. In order to better understand the arrangement of tongs, 68, 70, a single reference will be made pertinent to one of them, the one that is shown by FIG. 3. The stated tong, 68, is made up by a pair of fingers 72, 73, which are connected on a pivot to an external section of the cylindrical cavity 19, over the blowing head, 50, through a pair of pivoting screws, 74, 76. The upper section of each finger 72, 73 includes a toothed section 72A, 73A, which has a semi-circular shape respectively.

There are two pairs of the cylinder-piston assemblies, 78, 78A and 80, 80A, (See FIG. 1), for each one of the tongs, 68, 70, which are laterally located and in a vertical manner, with each one of the cylindrical cavities, 19, 19A, of chamber 18, between the lower part of said chamber, 18, and the supporting cover 16. Each one of the cylinder-piston assemblies, 78, 78A, and 80, 80A, includes a cylinder, 82, and a piston, 84, (See FIG. 3). A spring, 86, is located in the main chamber of the cylinder-piston assembly, 78, in order to carry out a descending movement of piston 84, as will be described later on. The stated piston, includes a rack section 87, which will be connected to coincide with each one of the toothed sections 72A, 73A, of each one of the fingers 72, 73.

In keeping with the above arrangement (FIG. 3), the movement of the fingers 72, 73, will operate under the following sequence: Once the blow nozzle, 30, and the blow head, 50, have finished the shaping of the article, said blow head, 50, has an ascending movement, and, also, at that time, the blow mold, M, opens. Once the mold has opened, fingers 72, 73, will close around the neck of the recently formed article and they pass underneath the blow head, 50. The closing movement of fingers 72, 73, is carried out due to the ascending movement of piston, 84, through a flow of pressurized air which is introduced through an entrance orifice, 88, located in chamber 18. Through this movement, the spring, 86, which is contained within the cylinder-piston assembly 78, is compressed. Later, once the shaping and transferring apparatus, 10, has ended its transferring movement, the pressurized air flow to the cylinder-piston chamber, 78, is stopped, and the fingers open by the action of the expanded spring, 86.

As can be seen in FIG. 3, the fingers 72, 73 of each tong 68 or 70 (FIG. 1), are made up of a single piece, having a central grooved section, 90, according to the diameter of the neck of the container.

In agreement with the previously described function, the operation cycle of the article forming and transferring apparatus, 10, of the present invention, will operate as follow:

Once a glass parison has been formed, whether it be through the blow-blow process or through the press-blow of forming machines, such as, for example, of the I.S. type, the parison is inverted to assume a normal position and placed in blow mold M, as is shown in FIG. 4.

Thereafter the glass parison has been placed in mold M, the arm, 14, of the forming and transferring mechanism, 10, moves from a delivery position in the front of the machine (FM), towards the blow mold M, (position A). In a sequence operation, said forming and transferring mechanism, 10, remains in an axial position with respect to the center of mold M, with the blowing nozzle, 30, and the blowing head, 10, over mold M, and the fingers 72, 73, in an open position (FIG. 3).

Subsequently, the blow nozzle, 30, and the blowing head, 50, (position B) move downwards. The blowing nozzle, 30, is introduced by the neck of the article E, for blowing or final shaping of the stated article E, while, the blowing head, 50, makes contact with the upper part of mold M, to form a pressure chamber during the final blowing of the article.

Once article E has been formed, the blowing head 50, has an upward movement (position C), while the nozzle, 30, keeps supplying cooling air to the recently formed article. After this, the blow mold M, (position D), opens and the tongs, 68, 70 (FIG. 1) close around the neck of container E, while the nozzle, 30, carries out an upward movement disengaging itself from the neck of the container.

After this, the shaping and transferring apparatus, 10, carries out its transference movement (position F) of the blowing mold, M, towards the front of the machine, FM, in order to deposit article E on a cooling plate, PE. While in this position, the tong 68 (fingers 72, 73 in FIG. 4) or tong 70, open (position G) in order to free the article E that was shaped, and the blowing-shaping mechanism, 10, goes up to its resting position, while a new glass parison arrives to the glass blowing mold, M.

Consequently, the invention is a method for shaping and transferring glass articles, and similar materials, which include the following steps:

a) shaping a glass parison in a parison mold of a glassware forming machine;

b) transferring the recently formed parison from the parison mold to a blowing mold for providing the final shape of the article;

c) coupling means for forming and transferring articles on the recently formed parison in said blowing mold;

d) providing a pressurized air flow inside the recently formed parison, through the means for shaping and transferring articles in order to carry out the final shaping of the article, and once that said article has been shaped, open the blowing mold;

e) gripping immediately the recently formed article with said means for forming and transferring articles in order to transfer the article from the blowing mold towards a deadplate in the front of the forming machine; and, f) releasing the recently formed article on said deadplate and returning said means for shaping and transferring articles towards a new shaping and transferring cycle in step c).

The method used for forming and transferring the articles includes an additional step of: continuously cooling the recently formed article during step d), after the shaping step in the blowing mold, and up to before releasing the article onto the deadplate PE.

In view of all the above, the present invention description has made reference to a method and apparatus for forming and transferring glass, or similar materials, which includes in a single mechanism the final blowing function for the forming of glass articles, and that of holding and transferring the recently formed articles to a deadplate in the front of the machine.

In spite of the fact that the previous description has only made reference to a specific embodiment of the method, and of an apparatus for the shaping and transferring of glass articles, it must be understood that the experts in the field will be able, through the know-how by this invention, to make changes in the design and distribution of the same, which, however, will be included within the true spirit and scope of the invention which is claimed in the following claims:

We claim:

1. Apparatus for shaping and transferring of a glass article in a glass forming machine, said shaping of said glass article being in a blowing mold, said transferring of said glass article being from said blowing mold to a deadplate in the front of the glass forming machine, comprising:

a support structure;

a housing supported by said support structure;

means for forming the glass article, said glass article being formed from a glass parison, said means for forming the glass article comprising:

means for blowing air inside the glass parison so as to form the glass article, said means for blowing air being supported by said housing for movement along a first longitudinal axis of said housing, said means for blowing air comprising:

a cylinder coupled on an upper part of the support structure;

a movable blow nozzle to provide blown air for the forming of the glass article and a cooling of the glass article once said glass article has been shaped;

a movable blow head to form a pressure chamber when said blow head is positioned on the blowing mold during the shaping of the glass article, said blow nozzle passing within and through said blow head; and means for moving said blow nozzle and said blow head, said means for moving being located within said housing, said blow nozzle and said blow head being secured to a lower part of the means for moving, said means for moving comprising:

a first hollow central fixed shaft within said cylinder;

a second hollow central shaft coupled between an internal part of said cylinder and the first hollow central fixed shaft, said second hollow central shaft being moved vertically through the internal part of the cylinder, said second hollow central shaft being connected at its lower end with the blow nozzle, said second hollow central shaft being movable with a first downward movement to permit a flow of blown air through the blow nozzle for forming the article in the blowing mold and a second upward movement to permit a flow of blown air through the blow nozzle for cooling the glass article during said transferring of said glass article from said blowing mold to said deadplate; and a third hollow shaft placed around the second hollow central shaft, said third hollow shaft being connected by its lower end with the blow head and moveable simultaneously with the second hollow central shaft, said third hollow shaft and blow head being independently retracted from the second hollow central shaft with an upward movement to permit a means for gripping the glass article to grip the glass article; and means for gripping the glass article, said means for gripping the glass article being supported by said housing, said means for gripping the glass article being combined with said means for forming the glass article within a single mechanism, said means for gripping the glass article comprising:

means for gripping mounted in an external part of said housing for a first movement of a first portion of said means for gripping between a gripping position to grip the glass article after said glass article has been shaped in the blowing mold and a retracted position to release the glass article, said first movement being produced by a second movement and a third movement of a second portion of said means for gripping and a third portion of said means for gripping, respectively, along a second longitudinal axis of said housing and a third longitudinal axis of said housing, respectively.

2. The apparatus of claim 1, wherein the means for moving further comprises a fourth hollow shaft which includes a stop to limit a descending movement of the third hollow shaft.

3. Apparatus for shaping and transferring of a glass article in a glass forming machine, said shaping of said glass article being in a blowing mold, said transferring of said glass article being from said blowing mold to a deadplate in the front of the glass forming machine, comprising:

a support structure;

a housing supported by said support structure;

means for forming the glass article, said glass article being formed from a glass parison, said means for forming the glass article comprising:

means for blowing air inside the glass parison so as to form the glass article, said means for blowing air being supported by said housing for movement along a first longitudinal axis of said housing; and means for gripping the glass article, said means for gripping the glass article being supported by said housing, said means for gripping the glass article being combined with said means for forming the glass article within a single mechanism, said means for gripping the glass article comprising:

means for gripping mounted in an external part of said housing for a first movement of a first portion of said means for gripping between a gripping position to grip the glass article after said glass article has been shaped in the blowing mold and a retracted position to release the glass article, said first movement being produced by a second movement and a third movement of a second portion of said means for gripping and a third portion of said means for gripping, respectively, along a second longitudinal axis of said housing and a third longitudinal axis of said housing, respectively, said means for gripping further comprising:

at least a pair of tongs, each pair of tongs including a pair of means for grasping, each means for grasping having a toothed section, said first portion of said means for gripping comprising one of said each pair of tongs; and a pair of cylinder-piston assemblies for each pair of tongs, said second portion of said means for gripping comprising a first cylinder-piston assembly of said pair of cylinder-piston assemblies and said third portion of said means for gripping comprising a second cylinder-piston assembly of said pair of cylinder-piston assemblies, each cylinder-piston assembly comprising a cylinder and a piston, said cylinder-piston assembly being externally supported on said housing, the piston of the cylinder-piston assembly including a rack section extending vertically, each one of said toothed section of each means for grasping and each rack section extending vertically being meshed to be moved by the cylinder-piston assembly for closing or opening the means for grasping of the tongs about the glass article.

4. The apparatus of claim 3, wherein the means for grasping are of a size to grasp the glass article.

* * * * *

UNITED STATES PATENT AND TRADEMARK OFFICE
CERTIFICATE OF CORRECTION

PATENT NO. : 5,807,419
DATED : September 15, 1998
INVENTOR(S) : RODRIGUEZ-WONG ET AL.

It is certified that error appears in the above-identified patent and that said Letters Patent is hereby corrected as shown below:

On the Cover Page of the Patent, in column 1, before the line reading "[51] Int. Cl. ........ C03B 9/00", insert the following -- [30] Foreign Priority Application Data December 14, 1992 [MX] Mexico ........... 927414 --.

Signed and Sealed this

Fourth Day of January, 2000

Attest:

*Attesting Officer*

*Acting Commissioner of Patents and Trademarks*